Dec. 7, 1926.

W. STACY

SAW SETTING ANVIL

Filed May 21, 1925

1,609,669

Inventor
W. Stacy
By D. Swift
Attorney

Patented Dec. 7, 1926.

1,609,669

UNITED STATES PATENT OFFICE.

WALLIS STACY, OF STACY, VIRGINIA.

SAW-SETTING ANVIL.

Application filed May 21, 1925. Serial No. 31,752.

The invention relates to saw setting anvils, and has for its object to provide a device of this character, preferably formed from a single piece of metal, and comprising a rectangularly shaped head adapted to engage the side of a saw, and provided with a bevelled surface adapted to register with teeth of the saw, and against which bevelled surface teeth of the saw may be bent by means of a saw set hammer to a desired angle.

A further object is to provide the head with an outwardly, upwardly and downwardly extending integral handle member adapted to be grasped in the hand of the operator for rigidly holding the head against the side of the saw. said handle member by being hooked obviates the necessity of the operator laying the anvil down when using the hand for applying a tooth gage to the saw.

A further object is to form the anvil and handle member from a single piece of metal cast to form, and at the same time an anvil which may be used on both sides of the saw, and one which is equally applicable whether used by right or left handed persons.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
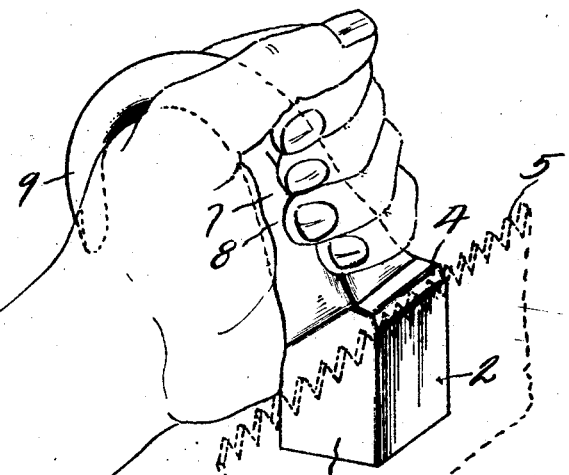
Figure 1 is a perspective view of the anvil showing the same in position for use.
Figure 3:
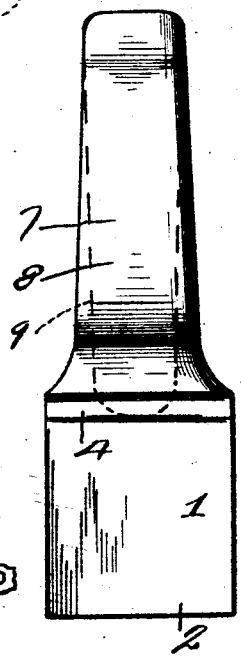
Figure 3 is a front elevation of the anvil.
Figure 2:
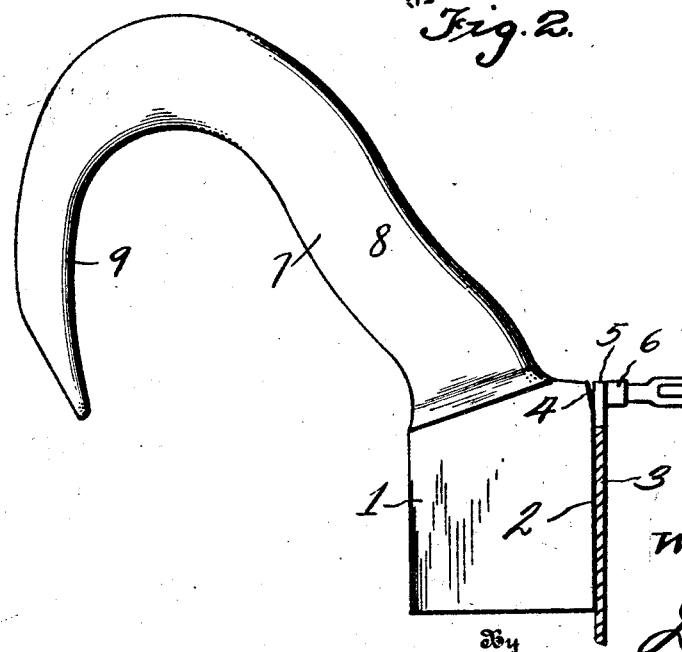
Figure 2 is a side elevation of the anvil showing a portion of a saw.

Referring to the drawing, the numeral 1 designates a rectangular shaped head of the device, the front side 2 of which is flat, and is adapted to be held in engagement with the side of the saw blade 3 as clearly shown in Figures 1 and 2. The upper end of the side 2 is provided with a bevelled portion 4 adapted to be held in registration with the teeth 5 of the saw, and against which bevelled surface the saw teeth 5 are bent by means of the saw setting hammer 6. It will be seen if the surface 2 is held in close engagement with the side of the saw blade, and the teeth 5 bent against the bevelled surface 4 the set of the teeth will be uniform. In setting the saw teeth the operator places the head 1 in engagement with the side of the saw blade and bends every other tooth 5 against the bevelled surface 4, and after which the device is shifted to the opposite side of the saw blade, and the other teeth bent against the bevelled surface 4, therefore it will be seen the saw teeth will be uniformly set to both sides of the saw blade. It will be seen by using the device danger of excessive bending of the teeth is obviated or breaking of the teeth is obviated, which is a common difficulty with saw sets at present constructed. It will also be seen that either long or short teeth may be set with the same device, consequently the anvil may be used in connection with various kinds and sizes of saws. Formed integral with the upper end of the anvil head 2 is an upwardly, outwardly and downwardly extending hooked handle 7, the portion 8 of which is provided with compound bends whereby it will conform to the curvature of the palm of the hand, thereby allowing the operator to firmly grasp the same as clearly shown in Figure 1 for rigidly holding the anvil head 1 in engagement with the side of the saw. The hooked portion 9 of the handle hooks over the hand of the operator between the thumb and forefinger, and forms a support for the device as a whole when the operator desires to hold in his hand a tooth gage and use the tooth gage on the teeth of the saw, at which time the anvil is entirely supported by the hook 9, and the hand is not in gripping engagement with the portion 8 of the handle.

From the above it will be seen that a saw setting anvil is provided, which is simple in construction, positive in operation, and one which may be cast from a single piece of metal, and consequently can be cheaply manufactured and sold.

The invention having been set forth what is claimed as new and useful is:—

The combination with a saw tooth setting anvil comprising a body member adapted to engage the side of a saw adjacent the teeth thereof, of a handle member, said handle member comprising an integral upwardly and outwardly extending member conforming to the transverse contour of the hand of a person, the upper end of said handle member terminating in a downwardly curved extension adapted to overlie the upper side of the hand of the operator and form a supporting hook for the device as a whole, said body member having its rear side disposed in a vertical plane, said handle member and body member being disposed at obtuse angles to each other, said rear side of said body member forming means for limiting the downward slipping of the hand on the handle member.

In testimony whereof I have signed my name to this specification.

WALLIS STACY.